US012801909B2

(12) United States Patent
Chen et al.

(10) Patent No.: US 12,801,909 B2
(45) Date of Patent: Nov. 17, 2026

(54) ENTIRELY ANALOG CIRCUITRY SYSTEM FOR HANDWRITTEN DIGIT RECOGNITION BASED ON COMPUTING-IN-MEMORY ARCHITECTURE

(71) Applicant: ZHEJIANG UNIVERSITY, Hangzhou (CN)

(72) Inventors: Bing Chen, Hangzhou (CN); Jiabao Ye, Hangzhou (CN); Xuecheng Cui, Hangzhou (CN); Wannian Wang, Hangzhou (CN); Jiayi Zhao, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 633 days.

(21) Appl. No.: 18/242,543

(22) Filed: Sep. 6, 2023

(65) Prior Publication Data

US 2024/0346304 A1 Oct. 17, 2024

Related U.S. Application Data

(63) Continuation of application No. PCT/CN2023/088451, filed on Apr. 14, 2023.

(51) Int. Cl.
*G06N 3/00* (2023.01)
*G06N 3/048* (2023.01)
*G06N 3/065* (2023.01)

(52) U.S. Cl.
CPC ............ *G06N 3/065* (2023.01); *G06N 3/048* (2023.01)

(58) Field of Classification Search
CPC ........... G06N 3/02; G06N 3/04; G06N 3/045; G06N 3/065; G06N 3/048
See application file for complete search history.

(56) References Cited

U.S. PATENT DOCUMENTS

| | | | | |
|---|---|---|---|---|
| 2014/0344200 A1* | 11/2014 | Schie | .................. | G02B 6/3863 706/20 |
| 2019/0318232 A1* | 10/2019 | Cruz-Albrecht | ....... | G06N 3/049 |
| 2023/0049032 A1* | 2/2023 | Tran | ....................... | G06N 3/065 |

* cited by examiner

*Primary Examiner* — Tuan T Lam

(57) ABSTRACT

Disclosed is an entirely analog circuitry system for handwritten digit recognition based on computing-in-memory architecture, which a first analog circuit and a second analog circuit, the first analog circuit includes the following circuit blocks: an input driver circuit, a first resistor array with a scale of m columns and 2n rows, a first current-to-voltage conversion circuit, a first subtraction circuit, and a first activation function circuit; the second analog circuit includes the following circuit blocks: a second resistor array with a scale of n columns and 20 rows, a second current-to-voltage conversion circuit, a second subtraction circuit, a second activation function circuit, and a voltage comparison circuit. The system can eliminate a data migration problem posed by the conventional Von Neumann architecture and does not require an assistance of any digital modules, thereby enabling accurate recognition with ultra-low latency.

7 Claims, 3 Drawing Sheets

ENTIRELY ANALOG CIRCUITRY SYSTEM FOR HANDWRITTEN DIGIT RECOGNITION BASED ON COMPUTING-IN-MEMORY ARCHITECTURE

CROSS-REFERENCE TO RELATED APPLICATIONS

The present application is a Continuation Application of PCT Application No. PCT/CN2023/088451, filed on Apr. 14, 2023, the entire contents of which are hereby incorporated by reference.

TECHNICAL FIELD

The present disclosure relates to the technical field of electronic information, integrated circuits and artificial neural networks, and in particular to an entirely analog circuitry system for handwritten digit recognition based on computing-in-memory architecture.

DESCRIPTION OF THE PRIOR ART

With the rapid development of computer and information technology, there are increasing demands on transmission speed and storage capacity of information, electronics, and circuit integration. Currently, artificial neural networks, which are very widely applied non-linear networks, have developed very mature and have achieved enormous success, and have lifted an intelligent revolution worldwide with a disruptive nature. But most of today's artificial neural networks are mostly run on conventional computers, which are designed based on a Von Neumann architecture, and computing and storage units of the conventional computers are separated. This will create "storage wall" and "power consumption wall" issues that severely limit the performance of neural networks. "Storage wall" refers to a mismatch in speed between CPU and memory, CPU operates much faster than memory reads and writes, and as CPU evolves, the operation speed of the CPU increases faster, but the speed of the memory increases relatively slower, this causes the CPU to waste a lot of time waiting for memory reads and writes to complete, thus limiting the performance of the overall computing system. "Power consumption wall" refers to the transmission of data involved in the processing of instructions executed by the CPU, the CPU needs to read the data from the memory and then write the computation result back to the memory. The transfer of data consumes a significant amount of energy, and as the CPU frequency increases, the amount of data transfer increases, which results in higher power consumption, thereby limiting the performance of the overall computing system.

Currently, new types of neural network hardware circuitry systems based on a computing-in-memory architecture are based on a combination of digital and analog circuits, and have the features of low integration, slow response, and high power consumption, and it is difficult to further improve the performance of the system. Therefore, it has been imminent to study and develop a new generation of entirely analog neural network system based on computing-in-memory architecture.

SUMMARY OF THE DISCLOSURE

An object of the present disclosure is to propose an entirely analog circuitry system for handwritten digit recognition based on computing-in-memory architecture, the system is implemented entirely by an analog circuitry based on a computing-in-memory architecture, both "storage wall" and "power consumption wall" issues brought by conventional Von Neumann architecture that severely limit neural network performance, can be eliminated without an assistance of any digital modules, the neural network hardware system can realize ultra-low latency recognition of manual digit recognition tasks. Existing solutions based on a combination of digital and analog circuits operate at a speed of about 1 millisecond, have an energy consumption of about 4 W, have a low level of integration that cannot be fully integrated on a single piece of circuit board. The system of the present disclosure operates at a speed of about 0.01 ms, has energy consumption of about 0.5 W, and is highly integrated and can be fully integrated on a piece of circuit board. Thus, the present disclosure has advantages of fast operating speed, low energy consumption and high integration compared to existing solutions. The present disclosure has a very broad promising application prospect in the field of research on new neural network hardware systems based on a computing-in-memory architecture, and is expected to provide a viable non-Von Neumann hardware solution for deep neural networks and edge computations, thereby bringing light to the future technological revolution.

The object of the present disclosure is achieved by the following technical means:

An entirely analog circuitry system for handwritten digit recognition based on computing-in-memory architecture, as shown in FIG. 1, including a first analog circuit and a second analog circuit, wherein the first analog circuit includes the following circuit blocks: an input driver circuit, a first resistor array with a scale of m columns and 2n rows, a first current-to-voltage conversion circuit, a first subtraction circuit, and a first activation function circuit;

the second analog circuit includes the following circuit blocks: a second resistor array with a scale of n columns and 20 rows, a second current-to-voltage conversion circuit, a second subtraction circuit, a second activation function circuit, and a voltage comparison circuit;

an input of the entirely analog circuitry system is m analog voltages generated by an external microcontroller with a touch capacitive screen, the input driver circuit inputs the m analog voltages into the first resistor array with the scale of m columns and 2n rows; a conductance of the first resistor array with the scale of m columns 2n rows is multiplied with the inputted m analog voltages, to results in one respective current value on each resistor, all current values on each row are accumulated and outputted at an end of the row; the first current-to-voltage conversion circuit converts the current value outputted in each row into a voltage value, and performs an amplification process to obtain 2n voltage values denoted $V_1$, $V_2$ . . . . $V_{2n}$; the first subtraction circuit performs a subtractive differential process on first n voltage values and last n voltage values of the 2n voltage values to produce n-way analog voltages $V_1'$, $V_2'$, . . . . $V_n'$, $V_i'=V_i-V_{i+n}$, i takes an value among 1-n; the first activation function circuit non-linearly activates the n-way analog voltages, and maps the n-way analog voltages in a voltage range of 0V-1V, to result in n-way voltages;

a conductance of the second resistor array with a scale of n columns and 20 rows is multiplied by the n-way voltages produced by the first activation function circuit, to results in one respective current value on each resistor, all current values on each row are accumulated and outputted at the end of the row; the second current-to-voltage conversion circuit converts the current values outputted in each row into voltage values and performs the amplification process to obtain 20 voltage values denoted $U_1, U_2, \ldots U_{20}$; the second subtraction circuit performs the subtractive differential process on first 10 voltage values and last 10 voltage values of the 20 voltage values to produce 10-way analog voltages, $U_1', U_2', \ldots U_{20}'$, $U_i'=U_i-U_{i+10}$, i takes a value among 1-10; the second activation function circuit non-linearly activates the 10-way analog voltages, and maps the 10-way analog voltages in a voltage range of 0V-1V, to result in 10-way voltages; the voltage comparison circuit respectively compares the 10-way voltages outputted by the second activation function circuit with a reference voltage of 0.5 V, and outputs a high level to a corresponding segment display for each way with a voltage greater than 0.5V, the number of the segment displays is 10 and the 10 segment displays correspond to 10-way of voltages and ten digits of 0-9, respectively, such that the corresponding digit for that way is lit up to complete a handwritten digit recognition function.

Further, the input driver circuit in the circuit blocks includes a non-inverting MOSFET driver chip, which converts m-way voltage signals of 3.3 V generated by the external microcontroller with the touch capacitive screen to voltage signals of 5V and increases a driving load capacity of the voltage of each way to 100 mA.

Further, the current-to-voltage conversion circuit includes a sampling resistor and an integrated operational amplifier, the sampling resistor has a value of 1Ω, to convert a current into a voltage, the integrated operational amplifier is configured to build an in-phase configuration amplifier, to amplify the voltage resulting from the sampling resistor.

Further, the subtraction circuit in the circuit blocks includes an integrated operational amplifier configured to amplify the 2n voltage values V1, V2 . . . . V2n.

Further, each of the first second activation function circuit and the second activation function circuit includes three stages of amplifying circuits which are connected in cascade, a first stage amplifying circuit includes a biased in-phase configuration operational amplifier and each of a second stage amplifying circuit and a third stage amplifying circuit includes an inverting configuration operational amplifier; the activation function is a Sigmoid function, the Sigmoid function is simplified to $y=0.2x+0.5$, wherein x and y are independent variable and dependent variable respectively, input voltage signals of the activation function circuit are divided into the following three segments: $(-\infty,-2.5\text{ V})$, $[-2.5\text{ V}, 2.5\text{ V}]$, $(2.5\text{ V}, +\infty)$, and the three segments of signals are mapped to 0-5 V in parallel by the first stage amplifying circuit; linear transformations are performed sequentially by the second stage amplifying circuit and the third stage amplifying circuit to ultimately map 0-5 V to 0-1 V, to implement the Sigmoid function.

Further, the voltage comparison circuit includes an integrated operational amplifier, the voltage comparison circuit is a single threshold voltage comparison circuit, when the voltage with a value greater than 0.5 V is inputted into the voltage comparison circuit and the voltage comparison circuit outputs a high level.

Further, the high level is 1 V.

The benefit of the present disclosure is that: compared to conventional neural network hardware systems, the present disclosure is implemented entirely by analog circuitry based on computing-in-memory architecture, the data migration problem posed by conventional Von Neumann architecture can be eliminated, and does not require an assistance of any digital modules, thereby enabling accurate recognition with ultra-low latency. The present disclosure has very broad application promise in the field of research on new neural network hardware systems, and is expected to provide a viable non-Von Neumann hardware solution for deep neural network and edge computation.

DESCRIPTION OF EMBODIMENTS

Specific embodiments of the disclosure are described in detail further below with reference to the accompanying drawings and examples. The following examples serve to illustrate the disclosure and are not intended to limit the scope of the disclosure.

Figure 1:
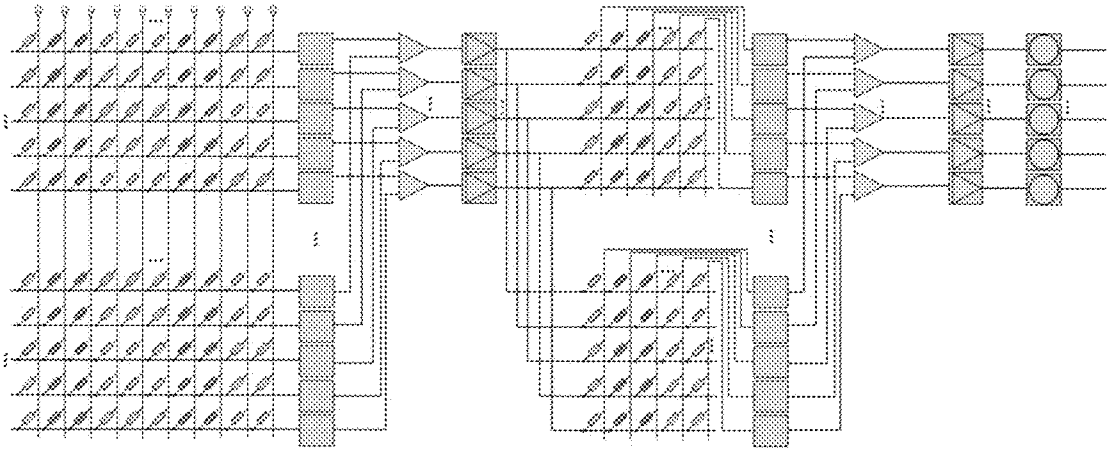
FIG. 1 is a circuit schematic of the present disclosure.

The present disclosure provides an entirely analog circuitry system for handwritten digit recognition based on computing-in-memory architecture, a circuit schematic of the system is shown in FIG. 1 and includes a first analog circuit and a second analog circuit, the first analog circuit includes the following circuit blocks: an input driver circuit, a first resistor array with a scale of 49 columns and 20 rows, a first current-to-voltage conversion circuit, a first subtraction circuit, and a first activation function circuit;

the second analog circuit includes the following circuit blocks: a second resistor array with a scale of 10 columns and 20 rows, a second current-to-voltage conversion circuit, a second subtraction circuit, a second activation function circuit, and a voltage comparison circuit.

Figure 2:
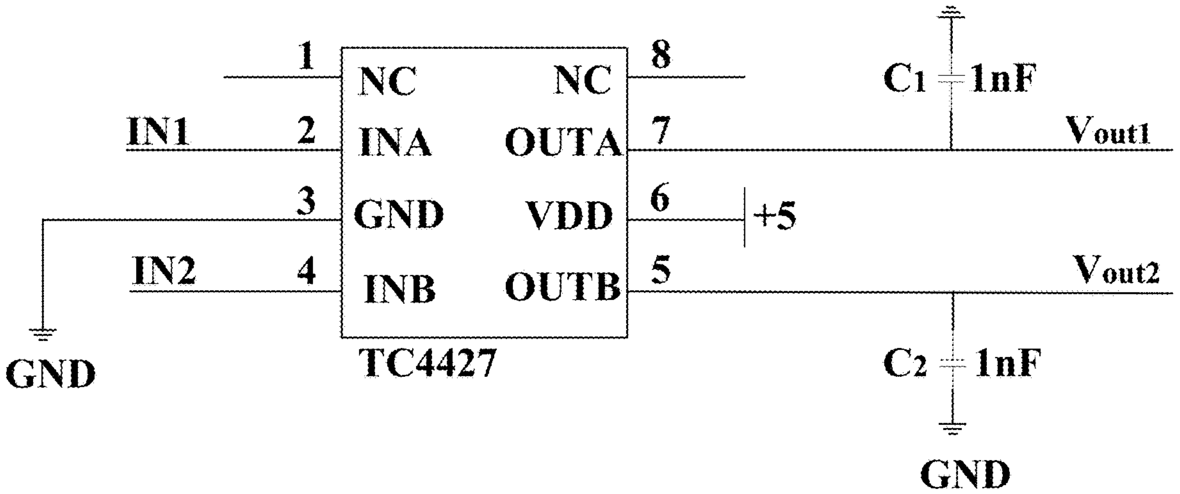
FIG. 2 is a circuit schematic of an input driver circuit of an example of the present disclosure.

The inputs of the entirely analog circuitry system are 49 analog voltages, the 49 analog voltages are generated by an external microcontroller with a touch capacitive screen (the microcontroller used in this example is a STM32F103ZET6 single-chip computer that is connected to a 4.3-inch capacitive touch screen served as an input device for handwritten digits, collects the handwritten digits, and converts the digits to 49 analog voltages), a load capability of each of the 49 analog voltages is enhanced by the input driver circuit to obtain 49 drive voltages, the input driver circuit includes a non-inverting MOSFET driver chip, converts the 49-ways of 3.3 V voltages generated by the external microcontroller with the touch capacitive screen to voltages of 5V, and increases the drive load capability of the voltage of each way to 100 mA; the input driver circuit can be implemented by a dual channel high speed power MOSFET driver, the TC4427 chip, which has advantages of high output current, wide supply voltage, and so on, a circuit schematic of the the input driver circuit is shown in FIG. 2.

Figure 3:
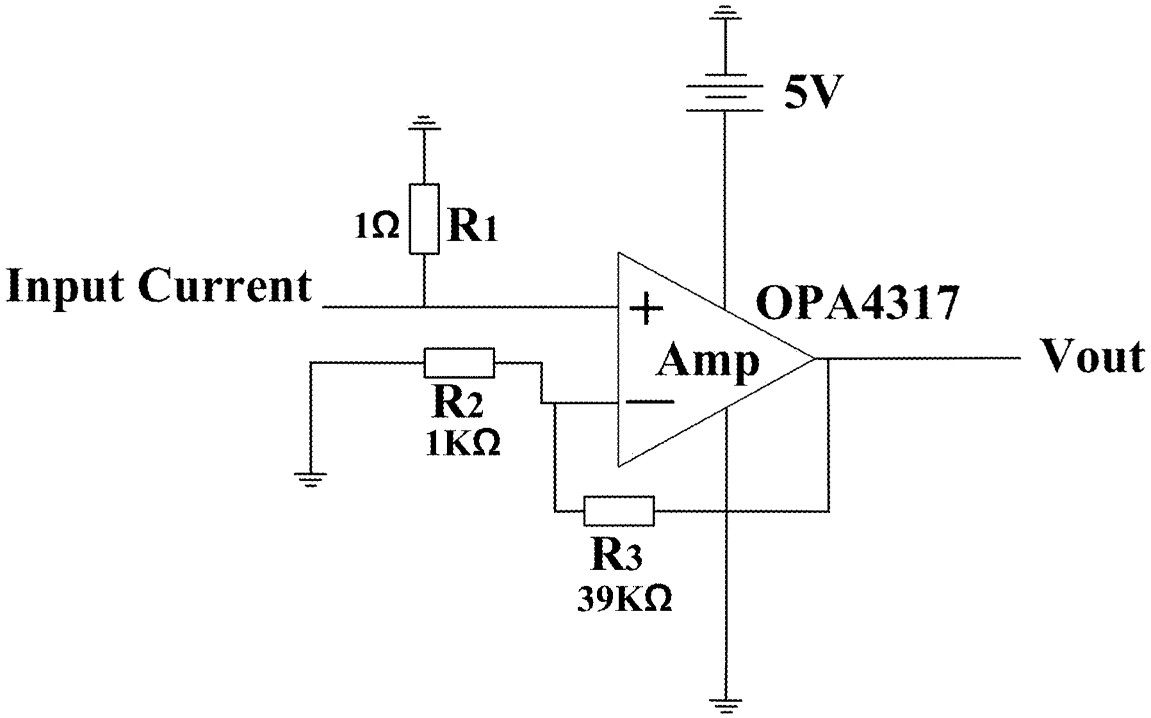
FIG. 3 is a circuit schematic of a first current-to-voltage conversion circuit and a second current-to-voltage conversion circuit of an example of the present disclosure.
Figure 4:
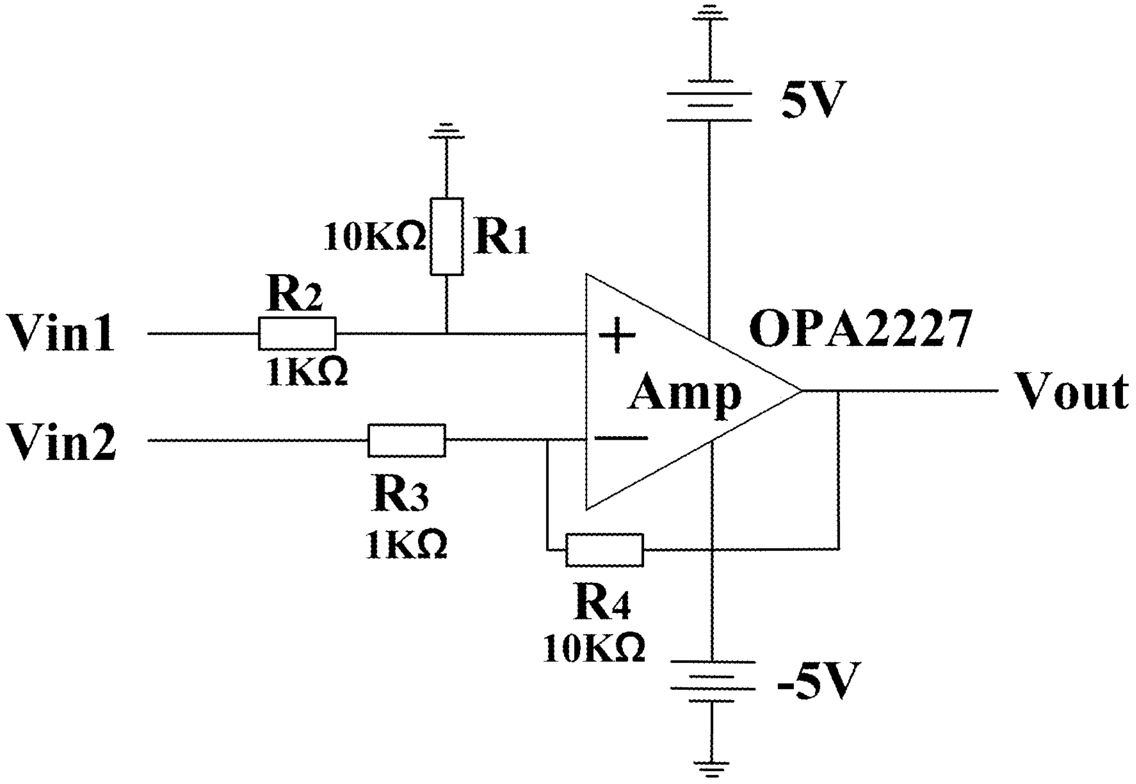
FIG. 4 is a circuit schematic of a first subtraction circuit and a second subtraction circuit of an example of the disclosure.
Figure 5:
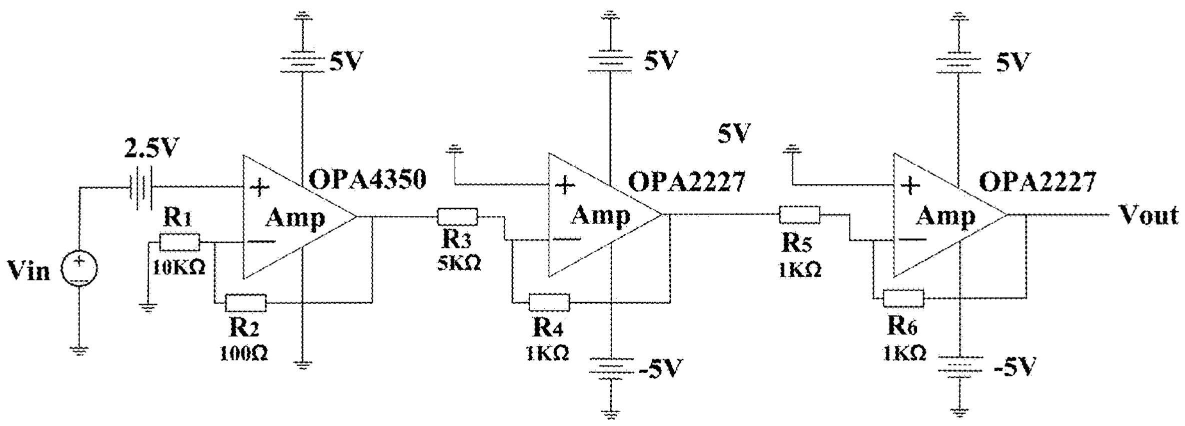
FIG. 5 is a circuit schematic of a first activation function circuit and a second activation function circuit of an example of the present disclosure.
Figure 6:
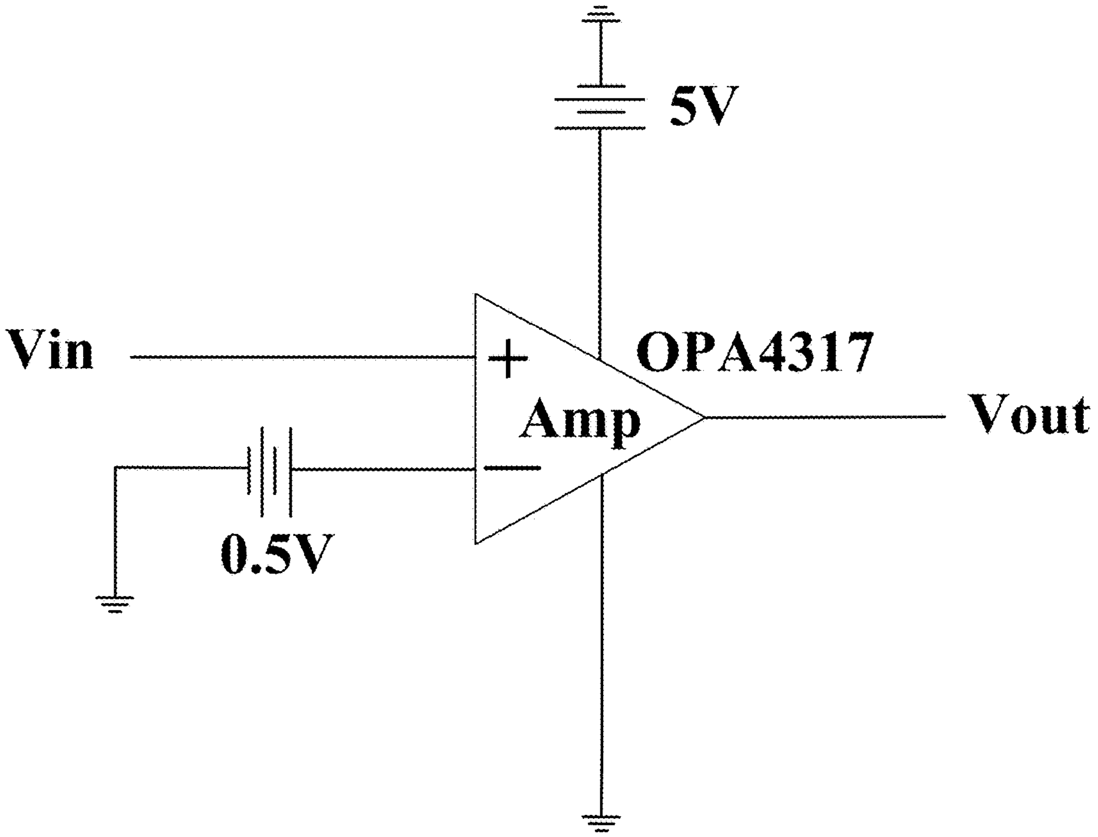
FIG. 6 is a circuit schematic of a voltage comparison circuit of an example of the present disclosure.

The input driver circuit inputs the drive voltages into a first resistor array with a scale of 49 columns and 20 rows, a conductance of the first resistor array with the scale of 49 columns and 20 rows is multiplied by the input drive voltages, to results in one respective current value on each resistor, all current values on each row are accumulated and outputted at the end of the row; the first current-to-voltage conversion circuit converts the current value outputted from each row into a voltage value, and performs an amplification process to obtain 20 voltage values denoted $V_1, V_2, \ldots, V_{20}$; the current-to-voltage conversion circuit is implemented by a sampling resistor and an integrated operational amplifier, the sampling resistor has a resistance value of 1Ω, is configured to convert the current accumulated in each row of the resistor array to a voltage, the integrated operational amplifier is configured to build an in-phase configuration amplifier, to amplify the voltage resulting from the sampling resistor by a factor of 40; the integrated operational amplifier can be implemented by the OPA4317 series of integrated operational amplifiers from TI Corporation, which have characteristics of low offset, rail-to-rail output, high speed, and low noise. The circuit schematic of the current-to-voltage conversion circuit is shown in FIG. 3. The first subtraction circuit performs subtractive differential process on first 10 voltage values and last 10 voltage values of the 20 voltage values to produce 10-way analog voltages $V_1'$, $V_2', \ldots, V_{10}'$, $V_i'=V_i-V_{i+10}$, i takes a value among 1-10; the subtraction circuit may be implemented by the OPA2227 series of integrated operational amplifiers of TI Corporation, which have characteristics of dual supply power, wide supply voltage range, high accuracy, and low noise. The circuit schematic of the first subtraction circuit is shown in FIG. 4. The first activation function circuit non-linearly activates the 10-way analog voltages, and maps analog voltages in a voltage range of 0V-1V, to result in 10-way voltages.

The activation function circuit includes three stages of amplifying circuits which are connected in cascade, to implement a Sigmoid function, wherein a first amplifying circuit includes a biased in-phase configuration operational amplifier and each of a second stage amplifying circuit and a third stage amplifying circuit includes an inverting configuration operational amplifier; the Sigmoid function is simplified to y=0.2 x+0.5, input voltage signals of the activation function circuit are divided into the following three segments: (−∞,−2.5 V), [−2.5 V, 2.5 V], (2.5 V, +∞), and the three segments of signals are mapped to 0-5 V in parallel by the first stage amplifying circuit; linear transformations are performed sequentially by the second stage amplifying circuit and the third stage amplifying circuit to ultimately map 0-5 V to 0-1 V, to implement the Sigmoid function. The first amplifying circuit includes an integrated operational amplifier powered by a 5V single supply, with rail-to-rail output, a bias voltage of 2.5 V and a magnification factor of 1; the first amplifying circuit may be implemented by OPA4350 series of integrated operational amplifier from TI Corporation, which have characteristics of single power supply, rail-to-rail output, high speed, low noise. The second amplifying circuit includes an integrated operational amplifier powered by a ±5 V dual supply, with an amplification factor of 0.2; the second amplifying circuit may be implemented by OPA2227 series of integrated operational amplifiers from TI Corporation, which have characteristics of dual supply power, wide supply voltage range, high accuracy, and low noise. The third stage amplifying circuit includes an integrated operational amplifier powered by a #5 V dual supply, with a magnification factor of 1; the third stage amplifying circuit may be implemented by OPA2227 series of integrated operational amplifiers from TI Corporation.

A conductance of the second array of resistors with the scale of 10 columns and 20 rows, is multiplied with the 10-way voltages generated by the first activation function circuit, to result in one respective current value on each resistor, all current values on each row are accumulated and outputted at the end of the row; the second current-to-voltage conversion circuit converts the current values outputted from each row into voltage values and performs an amplification process by a factor of 50 to obtain 20 voltage values denoted $U_1, U_2, \ldots, U_{20}$; the second subtraction circuit performs the subtractive differential process on first 10 voltage values and last 10 voltage values of the 20 voltage values to produce 10-way analog voltages, $U_1'$, $U_2', \ldots, U_{20}'$, $U_i'=U_i-U_{i+10}$, i takes a value among 1-10; the second activation function circuit non-linearly activates the 10-way analog voltages, and maps the 10-way analog voltages in a voltage range of 0V-1V, to result in 10-way voltages; the voltage comparison circuit respectively compares the 10-way voltages outputted by the second activation function circuit with a reference voltage of 0.5 V, and outputs a high level to a corresponding segment display for each way with a voltage greater than 0.5V, the number of the segment displays is 10 and the 10 segment displays correspond to 10-way of voltages and ten digits of 0-9, respectively, such that the corresponding digit for that way is lit up to complete a handwritten digit recognition function. The voltage comparison circuit may be implemented by the OPA4317 series of integrated operational amplifiers from TI Corporation, which have characteristics of low offset, rail to rail output, high speed, low noise.

As can be seen from the above embodiments, the inventive example enables recognition of handwritten digits, the system is implemented entirely by analog circuitry based on computing-in-memory architecture, can eliminate the data migration problem posed by the conventional Von Neumann architecture and does not require an assistance of any digital modules, and can enable accurate recognition with ultra-low latency. This system has very broad application promise in the field of research on new neural network hardware systems based on computing-in-memory architecture, and is expected to provide a viable non-Von Neumann hardware solution for deep neural network and edge computation.

The above examples have described in detail the technical solutions and advantages of the present disclosure, it should be noted that several modifications and alterations can also be made by those skilled in the art without departing from the principles of the present disclosure, and these modifications and alterations should also be considered to be within the protection scope of the present disclosure.

The invention claimed is:

1. An entirely analog circuitry system for handwritten digit recognition based on computing-in-memory architecture, characterized by comprising a first analog circuit and a second analog circuit; wherein the first analog circuit comprises the following circuit blocks: an input driver circuit, a first resistor array with a scale of m columns and 2n rows, a first current-to-voltage conversion circuit, a first subtraction circuit, and a first activation function circuit;

the second analog circuit comprises the following circuit blocks: a second resistor array with a scale of n columns and 20 rows, a second current-to-voltage conversion circuit, a second subtraction circuit, a second activation function circuit, and a voltage comparison circuit;

an input of the entirely analog circuitry system is m analog voltages generated by an external microcontroller with a touch capacitive screen, the input driver circuit boosts a load capability of each of the m analog voltages and results in m drive voltages, the input driver circuit inputs the drive voltages into the first resistor array with the scale of m columns and 2n rows; a conductance of the first resistor array with the scale of m columns 2n rows is multiplied with the inputted drive voltages, to results in one respective current value on each resistor, all current values on each row are accumulated and outputted at an end of the row; the first current-to-voltage conversion circuit converts the current value outputted in each row into a voltage value, and performs an amplification process to obtain 2n voltage values denoted $V_1$, $V_2$ . . . $V_{2n}$; the first subtraction circuit performs a subtractive differential process on first n voltage values and last n voltage values of the 2n voltage values to produce n-way analog voltages $V_1'$, $V_2'$, . . . $V_n'$, $V_i'=V_i-V_{i+n}$, i takes an value among 1-n; the first activation function circuit non-linearly activates the n-way analog voltages, and maps the n-way analog voltages in a voltage range of 0V-1V, to result in n-way voltages;

a conductance of the second resistor array with a scale of n columns and 20 rows is multiplied by the n-way voltages produced by the first activation function circuit, to results in one respective current value on each resistor, all current values on each row are accumulated and outputted at the end of the row; the second current-to-voltage conversion circuit converts the current values outputted in each row into voltage values and performs the amplification process to obtain 20 voltage values denoted $U_1$, $U_2$, . . . $U_{20}$; the second subtraction circuit performs the subtractive differential process on first 10 voltage values and last 10 voltage values of the 20 voltage values to produce 10-way analog voltages, $U_1'$, $U_2'$, . . . $U_{20}'$, $U_i'=U_i-U_{i+10}$, i takes a value among 1-10; the second activation function circuit non-linearly activates the 10-way analog voltages, and maps the 10-way analog voltages in a voltage range of 0V-1V, to result in 10-way voltages; the voltage comparison circuit respectively compares the 10-way voltages outputted by the second activation function circuit with a reference voltage of 0.5 V, and outputs a high level to a corresponding segment display for each way with a voltage greater than 0.5V, the number of the segment displays is 10 and the 10 segment displays correspond to 10-way of voltages and ten digits of 0-9, respectively, such that the corresponding digit for that way is lit up to complete a handwritten digit recognition function.

2. The entirely analog circuitry system for handwritten digit recognition based on computing-in-memory architecture of claim 1, wherein the input driver circuit in the circuit blocks comprises a non-inverting MOSFET driver chip, which converts m-way voltage signals of 3.3 V generated by the external microcontroller with the touch capacitive screen to voltage signals of 5V and increases a driving load capacity of the voltage of each way to 100 mA.

3. The entirely analog circuitry system for handwritten digit recognition based on computing-in-memory architecture of claim 1, wherein the current-to-voltage conversion circuit comprises a sampling resistor and an integrated operational amplifier, the sampling resistor has a value of 1Ω, to convert a current into a voltage, the integrated operational amplifier is configured to build an in-phase configuration amplifier, to amplify the voltage resulting from the sampling resistor.

4. The entirely analog circuitry system for handwritten digit recognition based on computing-in-memory architecture of claim 1, wherein the subtraction circuit in the circuit blocks comprises an integrated operational amplifier configured to amplify the 2n voltage values $V_1$, $V_2$ . . . $V_{2n}$.

5. The entirely analog circuitry system for handwritten digit recognition based on computing-in-memory architecture of claim 1, wherein each of the first second activation function circuit and the second activation function circuit comprises three stages of amplifying circuits which are connected in cascade, a first stage amplifying circuit comprises a biased in-phase configuration operational amplifier and each of a second stage amplifying circuit and a third stage amplifying circuit comprises an inverting configuration operational amplifier; the activation function is a Sigmoid function, the Sigmoid function is simplified to $y=0.2x+0.5$, wherein x and y are independent variable and dependent variable respectively, input voltage signals of the activation function circuit are divided into the following three segments: $(-\infty,-2.5\text{ V})$, $[-2.5\text{ V}, 2.5\text{ V}]$, $(2.5\text{ V}, +\infty)$, and the three segments of signals are mapped to 0-5 V in parallel by the first stage amplifying circuit; linear transformations are performed sequentially by the second stage amplifying circuit and the third stage amplifying circuit to ultimately map 0-5 V to 0-1 V, to implement the Sigmoid function.

6. The entirely analog circuitry system for handwritten digit recognition based on computing-in-memory architecture of claim 1, wherein the voltage comparison circuit comprises an integrated operational amplifier, the voltage comparison circuit is a single threshold voltage comparison circuit, when a voltage with a value greater than 0.5 V is inputted into the voltage comparison circuit and the voltage comparison circuit outputs a high level.

7. The entirely analog circuitry system for handwritten digit recognition based on computing-in-memory architecture of claim 6, wherein the high level is 1 V.

* * * * *